United States Patent
Barnett et al.

[11] 3,797,548
[45] Mar. 19, 1974

[54] SPRING CLIP

[75] Inventors: Barry Roger Michael Barnett, West Drayton, England; Clifford Alexander Seckerson, deceased, late of Iver Heath, England; Teresa Agnes Seckerson; Michael Alexander Seckerson, both of Iver Heath, England

[73] Assignee: TRW Inc., Cleveland, Ohio

[22] Filed: July 13, 1972

[21] Appl. No.: 271,333

[30] Foreign Application Priority Data
July 29, 1971 Great Britain .................... 35694/71
Jan. 17, 1972 Great Britain ...................... 2141/72

[52] U.S. Cl. ............................................. 151/41.75
[51] Int. Cl. ............................................. F16b 37/04
[58] Field of Search .............. 151/41.75; 85/36, 5 N

[56] References Cited
UNITED STATES PATENTS
2,115,312  4/1938  Lombard ........................ 151/41.75
2,399,958  5/1946  Tinnerman ..................... 151/41.75
3,723,941  3/1973  Schumacher et al. ........... 151/41.75
1,957,042  5/1934  Grant ................................... 85/36

FOREIGN PATENTS OR APPLICATIONS
801,366  9/1958  Great Britain ........................ 85/36
969,809  9/1964  Great Britain ................... 151/41.75

Primary Examiner—Edward C. Allen
Attorney, Agent, or Firm—James R. O'Connor; Hall & Houghton

[57] ABSTRACT

A threaded fastener passing through a bore in a member is axially loaded by a spring metal clip. The clip has two spaced, substantially parallel arms joined by a vertical web and the arms have aligned fastener receiving openings formed therethrough. The clip is mounted on the member with the openings in the arms disposed at opposite ends of the bore. One of the arms is divided into two sections by a slot passing through the opening therein and into the web. The sections of the latter arm are engaged by the threaded fastener and spread apart both radially and axially and thereby exert a vibration resisting tension on the threaded fastener.

5 Claims, 7 Drawing Figures

PATENTED MAR 19 1974  3,797,548
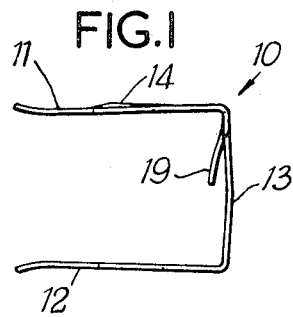
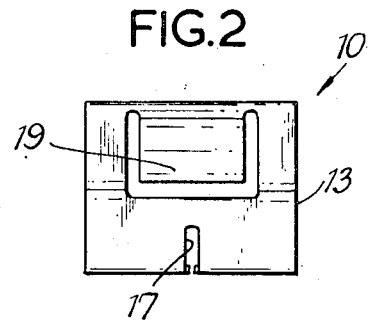
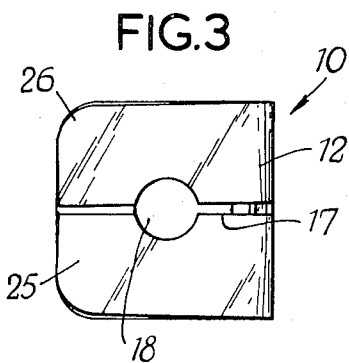
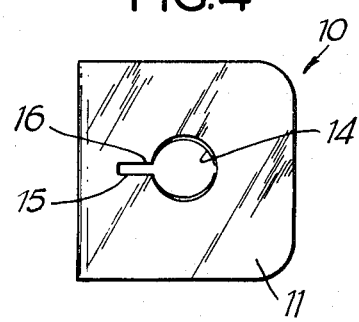
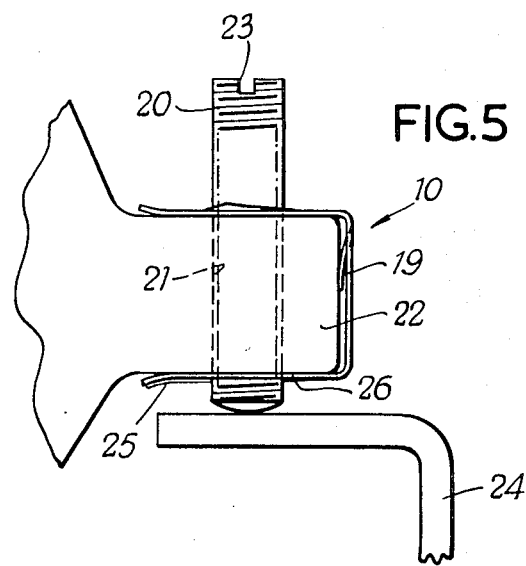
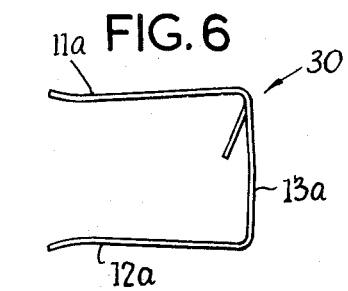
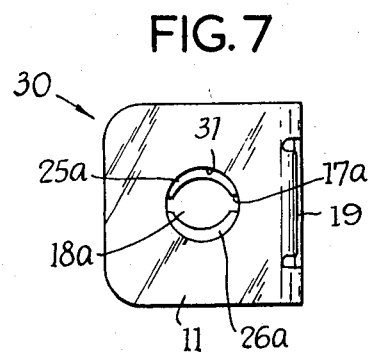

SPRING CLIP

BACKGROUND TO THE INVENTION

The present invention relates to a resilient clip for axially loading a threaded fastener. The clip of the invention is particularly suitable for use in attaching a screw or threaded bolt in position through an apertured member in such a manner that the screw is spring loaded by the clip.

In a conventional carburettor mechanism, a threaded bolt engages a slow running lever and adjustment of the threaded bolt through an apertured member adjusts the position of the slow running lever. In this known assembly, the threaded bolt is threadedly engaged through a hole in a support lug and a coil spring is provided between the lug and the head of the bolt to place the bolt under permanent tension and resist any tendancy for the bolt to rotate and work loose under vibration.

This known method of placing a threaded bolt under tension is expensive in that it necessitates the formation of a head on the bolt and the use of a coil spring. It is therefor an object of the present invention to provide a resilient clip which achieves the same results and which can be used in conjunction with a headless threaded bolt or screw.

STATEMENT OF THE INVENTION

According to one aspect of the present invention there is provided a resilient clip for axially loading a threaded fastener, the clip comprising two generally parallel flat arms joined by a web, one of the arms being formed with a first aperture and the other of the two arms being formed with a second, generally circular aperture which is aligned with the first aperture, wherein the other arm is divided into two portions by a slot which extends through the second aperture and into the web. Preferably the two portions of the said other arm are inclined inwardly and towards one another in a direction away from the web.

DESCRIPTION OF THE DRAWINGS

FIG. 1 is an elevation of a spring clip according to the present invention;

FIG. 2 is a side view of the clip shown in FIG. 1;

FIG. 3 is an underplan of the clip shown in FIG. 1;

FIG. 4 is a plan view of the clip shown in FIG. 1;

FIG. 5 is an elevation of an assembly showing a headless bolt secured in position through an apertured lug with the aid of the clip of FIGS. 1 to 4 in a vibration free manner, and FIGS. 6 and 7 are respectively an elevation and plan view of a modification of the clip shown in FIGS. 1 to 4.

DESCRIPTION OF THE PREFERRED EMBODIMENTS

In FIGS. 1 to 4 a resilient clip is indicated generally at 10 which is preferably formed from a single strip of metal and which is rendered resilient and rustproof during manufacture.

The clip 10 comprises two generally parallel flat arms 11 and 12 which are joined by a web 13 so that the clip is generally U-shaped.

The upper arm 11 (as seen in FIG. 1) is formed with a circular aperture 14 and with a short slot 15 which leads into the circular aperture 14, a corner 16 of the aperture 14 being bent upwardly out of the plane of the arm 11 to form the periphery of the aperture 14 on an approximate helix. The lower arm 12 is divided by a slot 17 which extends across the arm 12 and into the web 13. A circular aperture 18 is formed approximately in the centre of the arm 12 and is divided by the slot 17 into two part-circular portions.

A tongue 19 is sheared wholly from the web 13 and is bent upwardly so as to be directed downwardly towards the lower arm 12.

The clip 10 is used as shown in FIG. 5 to mount a threaded bolt 20 in a plain bore 21 formed in a supporting lug 22. The bolt 20 is headless and formed with a slot 23 to receive a screw-driver or similar torque applying tool. The bolt 20 passes through the aperture 21 in the lug 22 and its leading end bears against a lever 24 which by way of example, may comprise the slow running lever of a conventional carburettor. As can be seen from FIG. 5, adjustment of the axial position of the bolt 20 in relation to the lug 21 will cause pivoting movement of the lever 24 and thus adjustment of the carburettor mechanism.

The clip 10 is mounted on the lug 22 with the arms 11 and 12 embracing the lug and the apertures 14 and 18 aligned with the bore 21. The bolt 20 is then threaded downwardly through the aperture 14 in the upper arm, through the bore 21 in the lug 22 and through the aperture 18 in the lower arm. The diameter of the aperture 14 in the upper arm 11 is such that the periphery engages the thread on the bolt 20 and acts as a conventional nut enabling the bolt 20 to be threaded downwardly through the upper arm 11.

As can be seen best from FIG. 3, the slot 17 in the arm 12 divides the arm into two portions 25 and 26 and during manufacture of the clip 10, the web 13 is bowed slightly so that the free ends of the portions 25 and 26 are moved inwardly and the outer end of the slot 17 is narrower than the inner end adjacent the web 13. As the leading end of the bolt 20 enters the aperture 18 in the lower arm 12, the two portions 25 and 26 of the arm 12 are forced apart and one of the portions is depressed downwardly as it engages the leading part of the thread on the bolt. The thread on the other side of the bolt then engages the trailing portion of the arm 12 so that the arms are spread in an axial sense along the length of the bolt 20. Once the thread of the bolt has engaged both portions 25 and 26 of the arm 12, the bolt is thereafter frictionally loaded in a radial sense and in both axial directions by the two portions 25 and 26 of the lower arm 12 so that any tendancy for the bolt to move angularly under heavy vibration is eliminated or substantially reduced.

When the clip is mounted on the lug 22 and the bolt 20 is threaded through the clip, the tongue 19 in the web of the clip engages the outer face of the lug 22 to resist any vertical or angular movement of the clip relative to the lug 22.

In some applications it has been found more convenient to form a thread on the bore in the supporting lug 22, in which case a modified clip can be used, similar to the clip 30 shown in FIGS. 6 and 7.

The clip 30 is similar to the clip 10 except that the helically formed aperture 14 in the upper arm 11 of the clip 10 is replaced by a circular aperture 31. In all other respects the clip 30 is similar to the clip 10 and the same reference numerals with the suffix *a* added are used to indicate similar parts.

The aperture 31 in the upper arm 11a of the clip 30 is substantially greater than the crest diameter of the bolt 20 and in use the bolt is passed through the aperture 31 and is threadedly engaged in a threaded bore in the supporting lug 22. The lower arm 12a of the clip 30 is similar to the lower arm of the clip 10 and acts in a similar manner on the bolt 20 to resist rotation of the bolt under vibration.

In the clip 30 the tongue 19a is extended into the upper arm 11a to give it greater resilience and movement but in both the clip 10 or the clip 30, the tongue 19 or 19a can be omitted. The tongue assists in stabilising the clip on the supporting, lug is not an essential feature. If the clip is of relatively small dimensions then it is preferably omitted.

It will be seen from the above that the clip 10 or the modified clip 30, which are economic to mass-produce eliminate the necessity for a coil spring in the assembly and enable a headless bolt to be used in place of the more expensive headed bolt. It will also be seen that the bore 21 through the lug 22 can be either a plain bore further reducing the cost of the complete assembly or a threaded bore if this is more convenient or advantageous.

Further minor modifications can be made to the above described embodiment without departing from the spirit and scope of the invention which is best described in the following claims.

What we claim is:

1. A resilient sheet metal clip for axially loading a threaded fastener, the clip comprising two generally parallel flat arms joined by a web, one of the arms being formed with a first aperture and the other of the two arms being formed with a second, generally circular aperture which is aligned with the first aperture, the other arm being divided into two portions by a slot which extends through the second aperture and into the web, the two portions of the said other arm being inclined inwardly and towards one another in a direction away from the web, and a tongue sheared at least partly from the web and inclined outwardly of the web on the same side of the web as the arms.

2. A resilient sheet metal clip as claimed in claim 1, wherein the second aperture approximates to a circular aperture when the said two portions of the said other arm are spread apart and thereby placed under tension.

3. A clip as claimed in claim 1, wherein the first aperture is circular.

4. A clip as claimed in claim 3, wherein the first aperture has an approximately helical rim interrupted by a slot extending from the rim into the said one arm.

5. The combination of a threaded fastener engaged through a bore in a member and axially and laterally loaded against vibration by a resilient clip, in which the clip comprises two generally flat parallel arms which are formed by a web and which embrace the member, the arms being formed respectively with first and second apertures which are aligned with the opposite ends of the bore through the member, and in which the threaded fastener extends through the first aperture in one of the arms, through the bore in the member and through the second aperture in the other arm, the other arm being divided into two portions by a slot which extends through the second aperture and into the web, the diameter of the threaded fastener being such that its thread engages both said portions of the other arm and spreads the said portions in an axial and a radial sense so that the said portions resiliently grip the threaded fastener to resist rotation of the threaded fastener under vibration, and a tongue sheared at least in part from the web of the clip and being inclined to the web of the clip on the same side of the web as the arms, the tongue being pressed against the member so as to place a lateral loading on the clip relative to the threaded fastener.

* * * * *